United States Patent
Tamura et al.

(10) Patent No.: US 11,548,143 B2
(45) Date of Patent: Jan. 10, 2023

(54) ROBOT

(71) Applicant: SUMITOMO HEAVY INDUSTRIES, LTD., Tokyo (JP)

(72) Inventors: Mitsuhiro Tamura, Kanagawa (JP); Akira Yamamoto, Kanagawa (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 16/999,956

(22) Filed: Aug. 21, 2020

(65) Prior Publication Data

US 2021/0053210 A1   Feb. 25, 2021

(30) Foreign Application Priority Data

Aug. 21, 2019   (JP) .............................. JP2019-151112

(51) Int. Cl.
*B25J 17/02* (2006.01)
*B25J 9/10* (2006.01)

(52) U.S. Cl.
CPC .............. *B25J 9/102* (2013.01); *B25J 9/108* (2013.01); *B25J 17/02* (2013.01)

(58) Field of Classification Search
CPC ...... F16H 49/001; B25J 9/1025; B25J 9/0012
See application file for complete search history.

(56) References Cited

U.S. PATENT DOCUMENTS

| 3,899,945 A * | 8/1975 | Garrett .................... B26F 1/384 |
| | | 83/38 |
| 9,844,878 B2 | 12/2017 | Haddadin et al. |
| 2014/0371028 A1* | 12/2014 | Billmeyer ................ F16H 1/46 |
| | | 475/337 |
| 2018/0009111 A1* | 1/2018 | Ho ......................... B25J 9/1687 |
| 2019/0160654 A1 | 5/2019 | Moritani et al. |
| 2019/0299429 A1 | 10/2019 | Hamada |
| 2019/0346034 A1* | 11/2019 | Noda .................... F16H 57/045 |

FOREIGN PATENT DOCUMENTS

| DE | 10 2013 212 887 A1 | 4/2014 |
| DE | 11 2017 003 875 T5 | 4/2019 |
| DE | 10 2018 128 802 A1 | 5/2019 |
| DE | 10 2019 100 352 A1 | 8/2019 |
| EP | 1 764 530 B1 | 3/2012 |
| EP | 2 532 927 B1 | 3/2014 |
| JP | 2011-005610 A | 1/2011 |

OTHER PUBLICATIONS

Office Action issued in German Application No. 10 2020 121 249.6, dated Nov. 11, 2020.

* cited by examiner

*Primary Examiner* — Randell J Krug
(74) *Attorney, Agent, or Firm* — Michael Best & Friedrich LLP

(57) ABSTRACT

A robot includes a first joint and a second joint positioned on a base end side from the first joint. A first speed reducer is incorporated in the first joint. A second speed reducer is incorporated in the second joint. A volume proportion of a resin occupying a constituent member of the first speed reducer is larger than a volume proportion of a resin occupying a constituent member of the second speed reducer.

16 Claims, 5 Drawing Sheets

ROBOT

RELATED APPLICATIONS

The content of Japanese Patent Application No. 2019-151112, on the basis of which priority benefits are claimed in an accompanying application data sheet, is in its entirety incorporated herein by reference.

BACKGROUND

Technical Field

A certain embodiment of the present invention relates to a robot.

Description of Related Art

An articulated robot having a plurality of joints is known. The present applicant discloses an industrial robot having a plurality of joints in the related art. This industrial robot has a base stage on the floor, and first to sixth joint portions and first to sixth arms are alternately connected to each other from the base stage. Each joint portion has a motor and a speed reducer. Each arm receives power from the motor and the speed reducer and can rotate about an axial center of each joint portion.

SUMMARY

According to an aspect of the present invention, there is provided a robot including a first joint and a second joint positioned on a base end side from the first joint. In the robot, a first speed reducer is incorporated in the first joint. A second speed reducer is incorporated in the second joint. A volume proportion of a resin occupying a constituent member of the first speed reducer is larger than a volume proportion of a resin occupying a constituent member of the second speed reducer.

Any combination of the components described above and a combination obtained by switching the components and expressions of the present invention between methods, devices, and systems are also effective as an aspect of the present invention.

DETAILED DESCRIPTION

Figure 1:
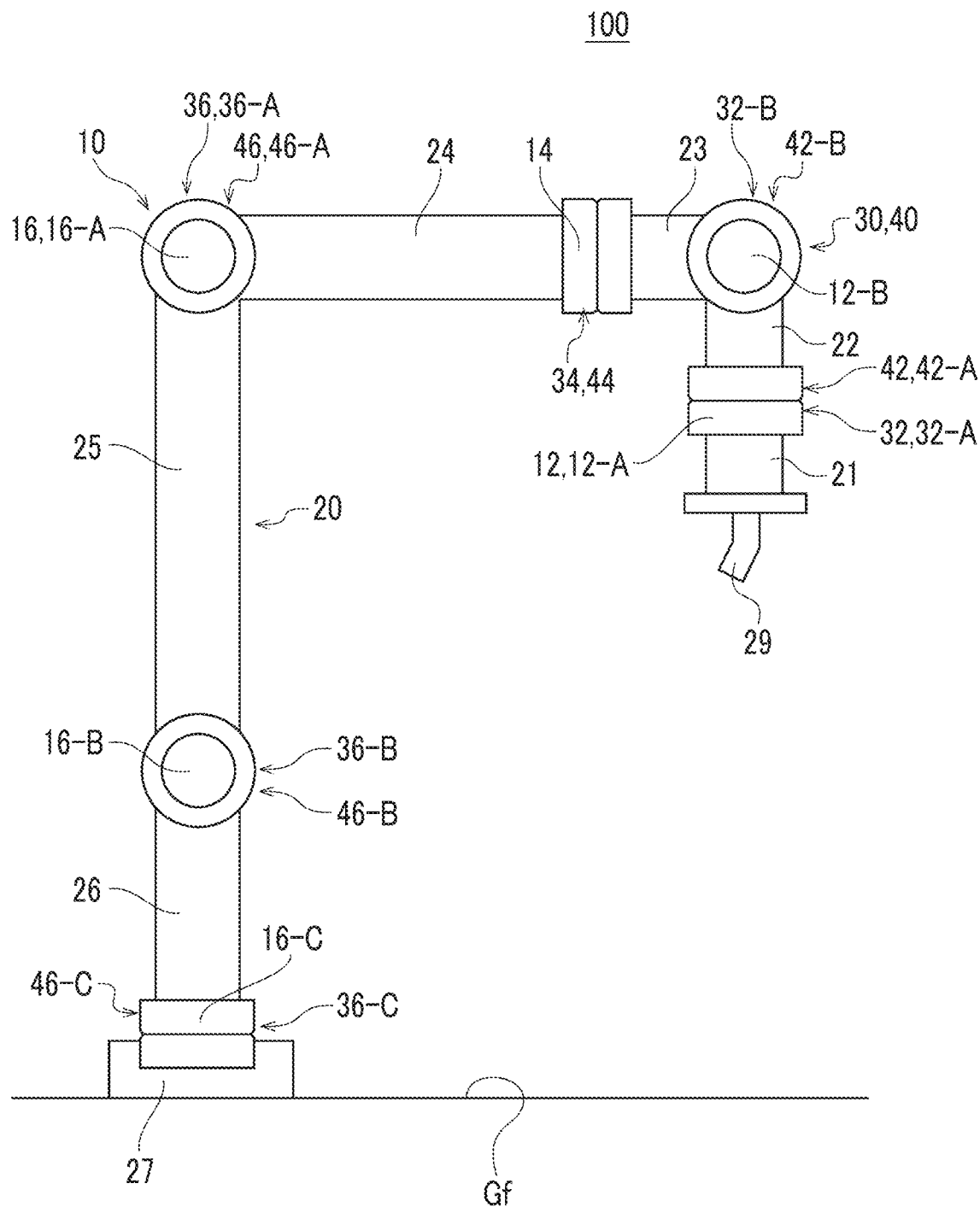
FIG. 1 is a side view schematically illustrating a robot according to one embodiment.

The present inventors have recognized as follows regarding a robot having a plurality of joints.

For example, using an articulated robot as a cooperative robot that works with a human in the same space or a service robot that provides guidance is considered. A movable portion of a robot that operates in the immediate vicinity of a human comes into contact with a human or surrounding objects in some cases depending on the movement of the robot. For this reason, it is desirable to reduce impact at the time of contact as much as possible. The robot that has the movable portion having a large mass and high stiffness is disadvantageous in reducing the impact at the time of contact of the movable portion. Although configuring the entire movable portion to have low stiffness is considered, there is also a problem that accuracy decreases excessively in this case.

Thus, the present inventors have recognized that the robot of the related art has room for improvement from a perspective of mitigating the impact at the time of contact.

It is desirable to provide a robot capable of mitigating impact at the time of contact.

The present inventors have conducted research on a cooperative robot from a perspective of mitigating impact at the time of contact, and have obtained the following findings. In order to reduce the impact at the time of contact, lowering the stiffness of a joint is considered. To this end, it is effective to increase a volume proportion of a resin (hereinafter referred to as a "resin proportion") occupying constituent members of a speed reducer incorporated in the joint (excluding a liquid or a gel such as a lubricant). However, when the resin proportion of the speed reducer is uniformly increased, the positioning accuracy of the robot decreases and use is limited. Thus, the present inventors have come up with an idea of increasing a resin proportion of a speed reducer of a joint positioned on a tip end side of robot and decreasing a resin proportion of a speed reducer of a joint positioned on a relatively base end side. By changing a resin proportion of a speed reducer depending on a position of a joint, it becomes possible to obtain practical accuracy while mitigating the impact. Hereinafter, an example of this idea will be described based on embodiments.

Hereinafter, the present invention will be described based on suitable embodiments with reference to each of the drawings. In the embodiments and a modified examples, the same or equivalent components and members will be assigned with the same reference symbols, and redundant description will be omitted as appropriate. A dimension of a member in each drawing is enlarged or contracted as appropriate in order to facilitate understanding. In addition, some of members that are not important for describing the embodiments will be omitted in each of the drawings.

In addition, although terms including ordinal numbers, such as first and second, are used in order to describe various components, the terms are used only for distinguishing one component from other components, and the terms do not limit the components. In addition, a plurality of components will be distinguished as reference symbols thereof are assigned with "-A", "-B", and "-C".

One Embodiment

Hereinafter, a configuration of a robot 100 according to one embodiment will be described with reference to the drawings. FIG. 1 is a side view schematically illustrating the robot 100 according to the embodiment. The robot 100 is an articulated robot having a plurality of arms connected between the tip end side and the base end side via a plurality of joints. Although the robot 100 of the embodiment exemplifies a cooperative robot that works in cooperation with a human, the robot of the present invention is not limited thereto, is applicable to various types of robots that work in the vicinity of a human instead of being isolated from the human, and is also applicable to, for example, a service robot that guides a human or a robot bogie that carries luggage. The robot 100 of the embodiment has a joint 10 and an arm 20.

The joint 10 includes a first joint 12, a second joint 14, and a third joint 16. The second joint 14 is positioned on the base end side from the first joint 12. The third joint 16 is positioned on the base end side from the second joint 14. In the embodiment, the first joint 12 includes a first joint 12-A and a first joint 12-B positioned on the base end side from the first joint 12-A. In the embodiment, only one second joint 14 is provided. In the embodiment, the third joint 16 includes a third joint 16-A, a third joint 16-B, and a third joint 16-C. The third joint 16-A is positioned on the tip end side from the third joint 16-B, and the third joint 16-B is positioned on the tip end side from the third joint 16-C.

The arm 20 includes a first arm 21, a second arm 22, a third arm 23, a fourth arm 24, a fifth arm 25, and a sixth arm 26. The first arm 21 is connected to the tip end side (output side) of the first joint 12-A. The second arm 22 is connected between the first joints 12-A and 12-B. The third arm 23 is connected between the first joint 12-B and the second joint 14. The fourth arm 24 is connected between the second joint 14 and the third joint 16-A. The fifth arm 25 is connected between the third joints 16-A and 16-B. The sixth arm 26 is connected between the third joints 16-B and 16-C. The base end side of the third joint 16-C is connected to a base stage 27, and the base stage 27 is fixed to a provision surface Gf.

A first motor 32 and a first speed reducer 42 are incorporated in the first joint 12. A second motor 34 and a second speed reducer 44 are incorporated in the second joint 14. A third motor 36 and a third speed reducer 46 are incorporated in the third joint 16. Each motor is not limited to being incorporated in the joint. In some cases, each motor is provided at a location apart from the joint, and transmits power to each speed reducer via a drive shaft.

The first to third motors 32 to 36 will be collectively referred to as a motor 30. The first to third speed reducers 42 to 46 will be collectively referred to as a speed reducer 40. When a rotational driving force is input from the motor 30 to the speed reducer 40, an output member of the speed reducer 40 decelerates and rotates, and the arm 20 rotates about an axial center of the joint 10. In the robot 100, the rotation of each arm 20 is controlled such that a tool 29 attached to the output side of the first arm 21 moves along a predetermined trajectory.

The motor 30 may be capable of inputting a rotational driving force to the speed reducer 40, and the motor can be adopted based on various principles. The motor 30 of the embodiment is a servo motor. In this case, the servo motor is preferable in that the servo motor has a small size, a large output, and a relatively long life and requires almost no maintenance.

A reduction mechanism of the speed reducer 40 is not particularly limited. For example, the speed reducer 40 may be a flexible meshing type speed reducer such as a cylinder type, a cup type, and a top hat type, may be an eccentric oscillating type speed reducer such as a center crank type and a distribution type, or may be a simple planetary gear type speed reducer. The first to third speed reducers 42, 44, and 46 may be reduction mechanisms different from each other, or may be the same type reduction mechanisms.

First Speed Reducer

Figure 2:
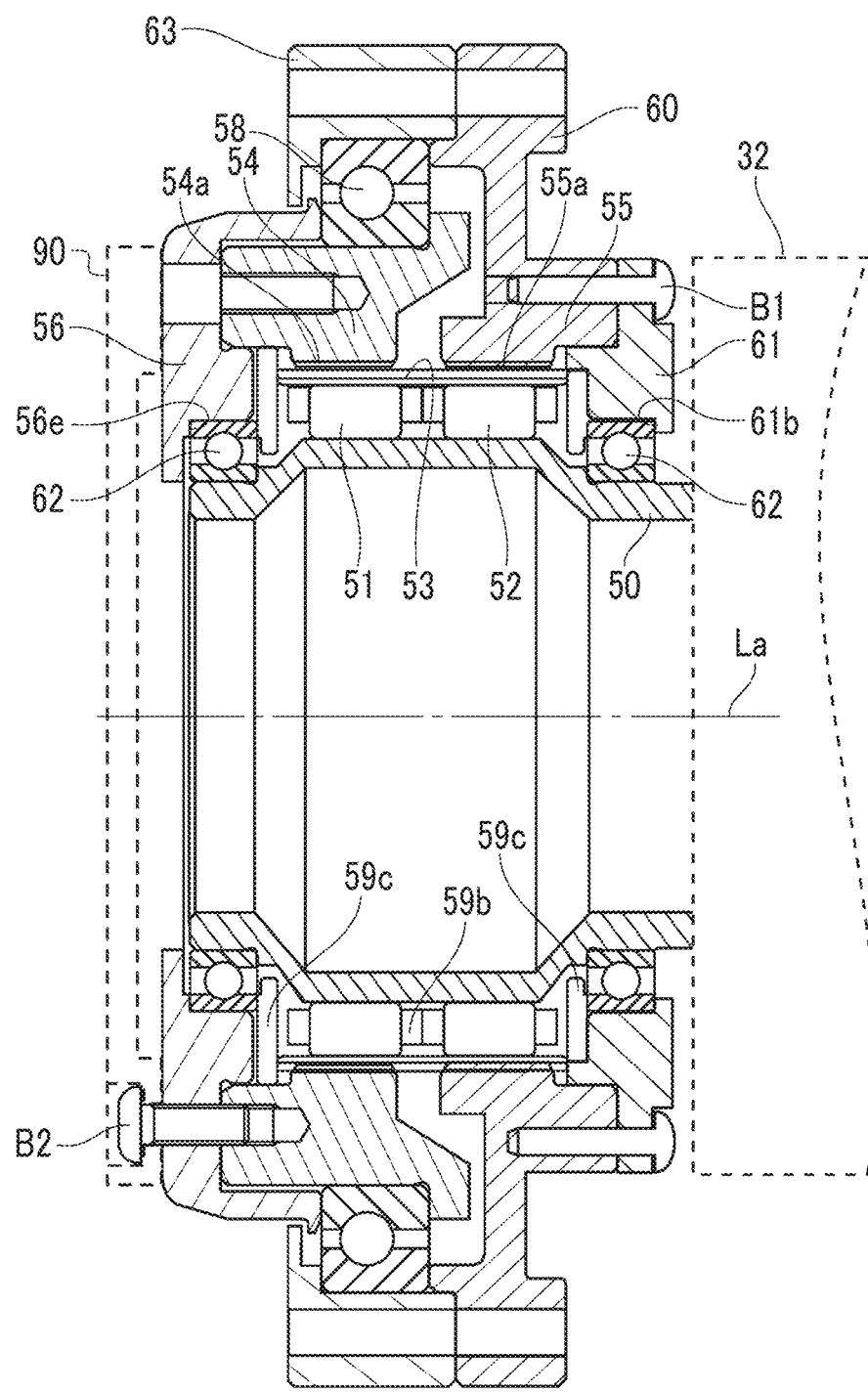
FIG. 2 is a side sectional view schematically illustrating a first speed reducer of the robot of FIG. 1.

A configuration of the first speed reducer 42 will be described. FIG. 2 is a side sectional view illustrating the first speed reducer 42. The first speed reducer 42 is a so-called flexible meshing type gear device (wave type gear device) that uses a differential between an ellipse and a perfect circle. The first speed reducer 42 of the embodiment mainly includes an input shaft 50, wave generation units 51 and 52, an external gear 53, internal gears 54 and 55, a first output member 56, a bearing support portion 63, a first main bearing 58, a casing 60, an input side cover 61, and an input shaft bearing 62.

Hereinafter, a direction along a center line La of rotation of the input shaft 50 will be simply referred to as an "axial direction", and a circumferential direction and a radial direction around the rotation center line La will be simply referred to as a "circumferential direction" and a "radial direction". In addition, one side in the axial direction will be referred to as an input side (right side in the drawing), and the other side (left side in the drawing) will be referred to as an opposite input side.

The internal gears 54 and 55 mesh with the external gear 53. The internal gears 54 and 55 include the internal gear 54 and the internal gear 55 provided on the input side from the internal gear 54. Washers 59c are provided on the opposite input side of the internal gear 54 and the input side of the internal gear 55. The first output member 56 synchronizes with the rotation of the internal gear 54. The bearing support portion 63 synchronizes with the rotation of the internal gear 55. The first main bearing 58 is disposed between the first output member 56 and the bearing support portion 63. The bearing support portion 63 is fixed to an external member (not illustrated). The first output member 56 is connected to a driven member 90. The input side cover 61 is fixed to a side portion of the casing 60 on the input side by a bolt B1. The driven member 90 is connected to the arm 20 (or is configured by the arm 20) and transmits a driving force to the arm 20.

The input shaft 50 is connected to an output shaft of the first motor 32 and is rotationally driven by the first motor 32. The input shaft 50 is a hollow cylindrical member, an input side thereof is supported by the input shaft bearing 62 disposed at the input side cover 61, and an opposite input side thereof is supported by the input shaft bearing 62 disposed at the first output member 56. An outer ring of the input shaft bearing 62 on the input side is housed in a recessed portion 61b provided in the input side cover 61. An outer ring of the input shaft bearing 62 on the opposite input side is housed in a recessed portion 56e provided in the first output member 56.

On an outer periphery of the input shaft 50, the wave generation units 51 and 52 each having an elliptical outer peripheral surfaces are provided. Retainers 59b that hold the wave generation units 51 and 52 are provided on the input side and the output side of the wave generation units 51 and 52. The wave generation units 51 and 52 include the wave generation unit 51 and the wave generation unit 52 provided on the input side from the wave generation unit 51. The wave generation units 51 and 52 are fitted at positions inside a body of the external gear 53. The wave generation units 51 and 52 come into contact with the inside of the external gear 53 to bend the external gear 53 in the radial direction and partially mesh with the internal gear, and move a meshing position between the internal gear 54 or 55 and the external gear 53 in the circumferential direction.

In the embodiment, the wave generation unit 51 moves a meshing position between the external gear 53 and the internal gear 54 in the circumferential direction, and the wave generation unit 52 moves a meshing position between the external gear 53 and the internal gear 55 in the circumferential direction. The wave generation unit 51 includes a wave generator that is provided on the input shaft 50 and has a substantially elliptical outer peripheral shape and a wave generator bearing that is disposed between the wave generator and the external gear 53. The wave generation unit 52 has the wave generator common to the wave generation unit 51 and a wave generator bearing disposed between the wave generator and the external gear 53.

The external gear 53 is disposed on the inside of the internal gears 54 and 55, and has external teeth on an outer peripheral surface that bends in the radial direction when coming into contact with the wave generation units 51 and 52. The internal gears 54 and 55 include the internal gear 54 and the internal gear 55 provided on the input side from the internal gear 54. Out of the external teeth of the external gear 53, the internal gear 54 meshes with external teeth that are bent by the wave generation unit 51. Out of the external teeth of the external gear 53, the internal gear 55 meshes with external teeth that are bent by the wave generation unit 52. The internal gear 54 is a hollow disk-shaped member, and internal teeth 54a are integrally provided on an inner peripheral surface thereof. The internal gear 55 is a hollow disk-shaped member, and internal teeth 55a are integrally provided on an inner peripheral surface thereof. In the embodiment, the number of teeth of the internal gear 54 is the same as the number of teeth of the external gear 53, and the number of teeth of the internal gear 55 is larger than the number of teeth of the external gear 53 by 2. The number of teeth of the internal gear 54 and the number of teeth of the internal gear 55 may be changed depending on desired characteristics.

The first output member 56 is a hollow annular member to which power from the internal gear 54 is transmitted. A side portion of the first output member 56 of the embodiment on the input side is fixed to a side portion of the internal gear 54 on the opposite input side by a bolt B2. By configuring in such a manner, the first output member 56 moves in synchronization with the rotation of the internal gear 54.

The casing 60 is a hollow cylindrical member integrally formed with the internal gear 55. The casing 60 connects the internal gear 55 to the bearing support portion 63, and transmits power from the internal gear 55 to the bearing support portion 63. The bearing support portion 63 of the embodiment is a hollow annular member disposed radially outside the first output member 56. The bearing support portion 63 is fixed to a side portion of the casing 60 on the opposite input side by a bolt (not illustrated). By configuring in such a manner, the bearing support portion 63 is in synchronization with the rotation of the internal gear 55.

An operation of the first speed reducer 42 of the embodiment configured as described above will be described. When rotational power is transmitted from the first motor 32 to the input shaft 50, the wave generation unit 51 and the wave generation unit 52 provided on the outer periphery of the input shaft 50 rotate. When the wave generation unit 51 and the wave generation unit 52 rotate, the external gear 53 is bent in the radial direction to be partially meshed with the internal gears 54 and 55, and the meshing position between the internal gear 54 or 55 and the external gear 53 is moved in the circumferential direction. In this case, the internal gear 55 and the external gear 53 relatively rotate by an amount corresponding to a difference in number of teeth. Specifically, the external gear 53 rotates. On the other hand, since the internal gear 54 has the same number of teeth as the external gear 53, relative rotation does not occur and the internal gear rotates integrally with the external gear 53. That is, the rotation (decelerated rotation) of the external gear 53 is output from the internal gear 54. As a result, the decelerated rotation is transmitted from the internal gear 54 to the driven member 90 via the first output member 56.

A resin proportion of the first speed reducer 42 will be described. When the resin proportion of the first speed reducer 42 positioned on the tip end side of the robot from the second joint 14 is low, an impact mitigation effect is small. For this reason, the resin proportion of the first speed reducer 42 is higher than the resin proportion of the second speed reducer 44 in the embodiment, and is set to 70% or more in the embodiment. In the embodiment, for example, the resin proportion is 70%, and in order to realize this, for example, the internal gears 54 and 55, the first output member 56, the input side cover 61, the retainer 59b, the casing 60, and the bearing support portion 63 each are a constituent member made of a resin (hereinafter, referred to as a "resin constituent member"). The resin constituent member can be made by using various resins such as polyacetal (POM) and polyetheretherketone (PEEK).

The resin used in the resin constituent member may be a resin containing reinforcing fibers such as glass fibers and carbon fibers, may be a resin containing no reinforcing fibers, or a may be a material formed by making a base material such as paper and cloth impregnated with a resin and being laminated. In particular, the resin used in each constituent member of the embodiment may be a resin in which a heat conductive filler is mixed. Examples of the heat conductive filler include ceramic powder, such as nano-order filler, aluminum oxide, and aluminum nitride, and metal powder, such as aluminum, copper, and graphite.

In the embodiment, rolling elements and the outer ring of the wave generator bearing, the external gear 53, the first main bearing 58, the input shaft 50, the input shaft bearing 62, the washers 59c, and the bolts B1 and B2 are constituent members made of a metal material (hereinafter, referred to as "metal constituent members"). The metal constituent member can be made of various metals, such as light metals including iron-based metals, copper-based metals, aluminum, magnesium, beryllium, and titanium (metals having a specific gravity of 4 to 5 or less), and composite materials thereof.

The description above regarding the resin constituent member and the metal constituent member is similarly applied to the second speed reducer 44 and the third speed reducer 46 to be described later. The volume of each member may be theoretically obtained by calculation, or a member to be measured may be submerged in water and be measured by a change in the water level. In addition, although a volume proportion of a resin occupying constituent members of a speed reducer (resin proportion) is a ratio of the volume of an occupying resin constituent member to the total volume of all the constituent members of the speed reducer, a lubricant enclosed in an internal space of the speed reducer is not included in the constituent members of the speed reducer. In addition, when a spacer is interposed between an output member of a speed reducer (the first output member 56 of the first speed reducer 42) and the driven member 90 on a robot side, the spacer is included in the technical scope of the present invention if conditions described in the claims are met in any one of a case where the spacer is included in the constituent members of the speed reducer or a case where the spacer is not included in the constituent members of the speed reducer. However, in a case where the spacer is included in the constituent members of the speed reducer, the resin proportion is compared after being included in the constituent members for all the first to third speed reducers. In a case where the spacer is not included in the constituent members, the resin proportion is compared without being included in the constituent members for all the first to third speed reducers.

Second Speed Reducer

Figure 3:
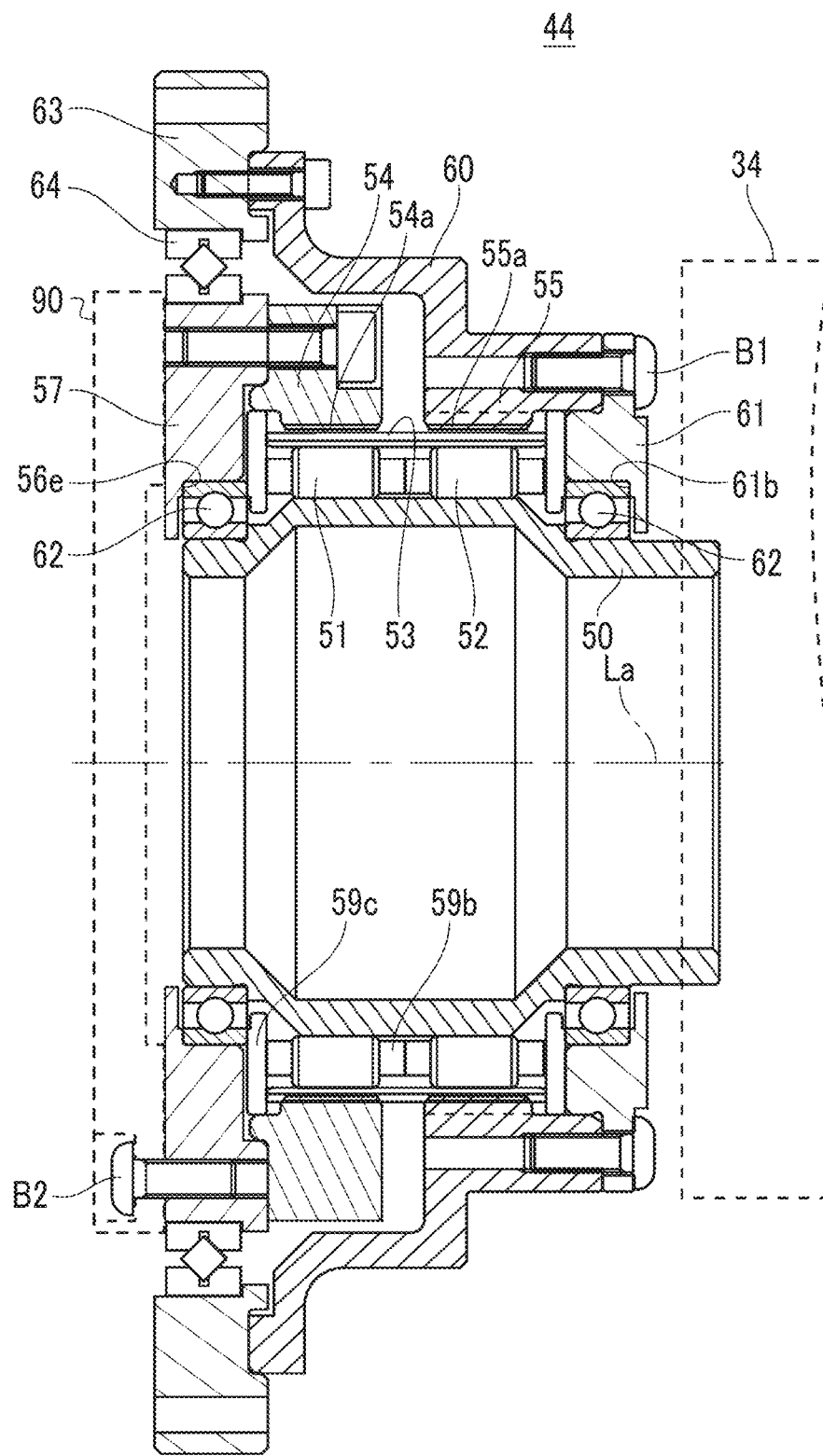
FIG. 3 is a side sectional view schematically illustrating a second speed reducer of the robot of FIG. 1.

A configuration of the second speed reducer 44 will be described. In the drawings and the description of the second speed reducer 44, the same or equivalent components and members as the first speed reducer 42 will be assigned with the same reference symbols. Description that is redundant with the first speed reducer 42 will be omitted as appropriate, and configurations different from the first speed reducer 42 will be mainly described. FIG. 3 is a side sectional view illustrating the second speed reducer 44. In this example, the second speed reducer 44 is also a flexible meshing type gear device. The second speed reducer 44 of the embodiment mainly includes the input shaft 50, the wave generation units 51 and 52, the external gear 53, the internal gears 54 and 55, a second output member 57, the bearing support portion 63, a second main bearing 64, the casing 60, the input side cover 61, and the input shaft bearing 62. The constituent members correspond to the constituent members of the first speed reducer 42 having the same reference symbols and thus have the same characteristics.

In the second speed reducer 44, the input shaft 50 is connected to an output shaft of the second motor 34 and is rotationally driven by the second motor 34. Although a ball bearing of which rolling elements are spherical is used as the first main bearing 58 in the first speed reducer 42, a cross roller bearing is used as the second main bearing 64 in the second speed reducer 44.

The second output member 57 corresponds to the first output member 56. A side portion of the second output member 57 on the input side is fixed to the side portion of the internal gear 54 on the opposite input side by the bolt B2. The second output member 57 is connected to the driven member 90. The second main bearing 64 is disposed between the second output member 57 and the bearing support portion 63. By configuring in such a manner, the second output member 57 moves in synchronization with the rotation of the internal gear 54.

A resin proportion of the second speed reducer 44 will be described. When the resin proportion of the second speed reducer 44 that supports a mass larger than the first joint 12 does is high, the positioning accuracy of the robot decreases. In addition, when the resin proportion of the second speed reducer 44 positioned on the tip end side of the robot from the third joint 16 is low, an impact mitigation effect is small. For this reason, the resin proportion of the second speed reducer 44 is lower than the resin proportion of the first speed reducer 42, and is higher than the resin proportion of the third speed reducer 46 in the embodiment. The resin proportion of the second speed reducer is set to be within a range of 40% to 60% in the embodiment. In this case, it is advantageous from a perspective of mitigating impact and maintaining accuracy.

For example, the resin proportion of the second speed reducer 44 of the embodiment is 50%, and in order to realize this, for example, the internal gears 54 and 55, the retainer 59b, the casing 60, and the input side cover 61 each are a resin constituent member. In addition, the input shaft 50, the wave generation units 51 and 52, the external gear 53, the second output member 57, the second main bearing 64, the input shaft bearing 62, the bearing support portion 63, the washers 59c, and the bolts B1 and B2 each are a metal constituent member. That is, the second speed reducer 44 is different from the first speed reducer 42 in that the first output member 56 and the bearing support portion 63 are metal constituent members.

Moment acting on the main bearing will be described. The first joint 12-B supports the first and second arms 21 and 22, the first joint 12-A, and the tool 29. In addition, the second joint 14 supports the first to third arms 21, 22, and 23, the first joints 12-A and 12-B, and the tool 29. That is, the second joint 14 supports a mass larger than the first joint 12-B does by the amount of the third arm 23 and the first joint 12-B.

For this reason, moment corresponding to the supported mass described above acts on the first main bearing 58 of a first speed reducer 42-B of the first joint 12-B via the first output member 56. In addition, the moment corresponding to the supported mass described above acts on the second main bearing 64 of the second speed reducer 44 of the second joint 14 via the second output member 57. Therefore, the moment that acts on the second main bearing 64 supporting the second output member 57 of the second speed reducer 44 is larger than the moment that acts on the first main bearing 58 supporting the first output member 56 of the first speed reducer 42-B. Moment that acts on the first main bearing 58 supporting the first output member 56 of a first speed reducer 42-A is smaller than the moment acting on the first main bearing 58 of the first speed reducer 42-B.

Third Speed Reducer

Figure 4:
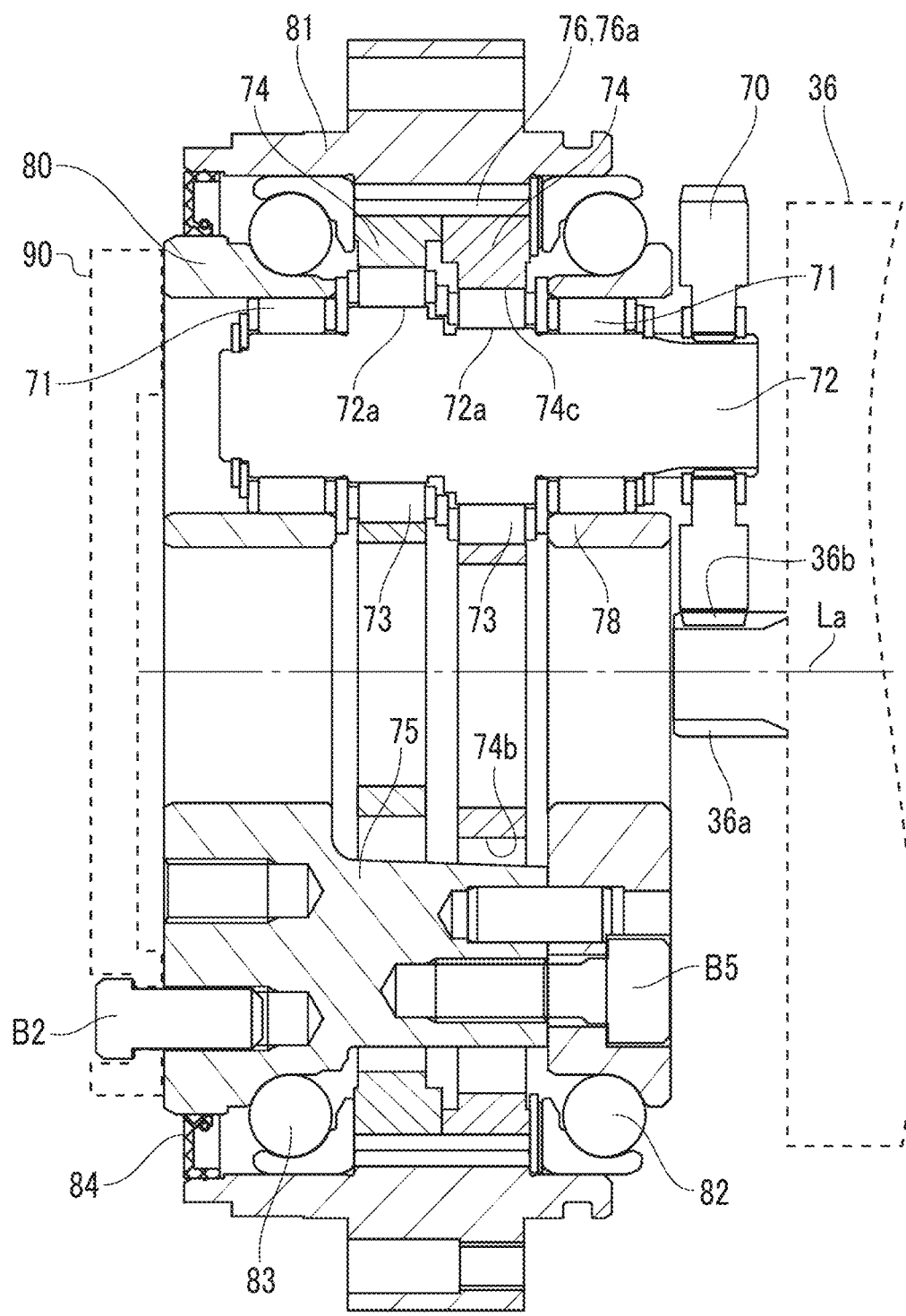
FIG. 4 is a side sectional view schematically illustrating a third speed reducer of the robot of FIG. 1.

A configuration of the third speed reducer 46 will be described. In the drawings and the description of the third speed reducer 46, the same or equivalent components and members as the first speed reducer 42 will be as signed with the same reference symbols. Description that is redundant with the first speed reducer 42 will be omitted as appropriate, and configurations different from the first speed reducer 42 will be mainly described. FIG. 4 is a side sectional view illustrating the third speed reducer 46.

The third speed reducer 46 is a so-called eccentric oscillating type speed reducer, which is a distribution type. The third speed reducer 46 mainly includes an input gear 70, an input shaft 72, an external gear 74, an internal gear 76, a carrier 78, a third output member 80, a casing 81, main bearings 82 and 83, a roller bearing 73, a carrier pin 75, and an oil seal 84.

The plurality of input gears 70 are disposed around the center axis line La of the internal gear 76. In the drawing, only one input gear 70 is illustrated. The input gear 70 is supported by the input shaft 72 inserted into the center of the input gear, and is provided so as to be able to rotate integrally with the input shaft 72. The input gear 70 meshes with an external tooth portion 36b of an output shaft 36a of the third motor 36 provided on the center axis line La. The rotation of the output shaft 36a of the third motor 36 causes the input gear 70 to rotate integrally with the input shaft 72.

The plurality of (for example, three) input shafts 72 of the third speed reducer 46 are disposed at positions offset from the center axis line La of the internal gear 76 with a space placed in the circumferential direction. In the drawing, only one input shaft 72 is illustrated. At each of the input shafts 72, two eccentric bodies 72a of which eccentric phases are shifted from each other by 180° are provided to be arranged in the axial direction.

The two external gears 74 are incorporated on the outer peripheries of the eccentric bodies 72a via the roller bearings 73. Each of the external gears 74 is internally meshed with the internal gear 76. The configurations of the respective external gears 74 are the same except that the eccentric phases are different from each other. The external gear 74 is provided to individually correspond to each of the plurality of eccentric bodies 72a.

The carrier 78 is disposed at a side portion of the external gear 74 on the input side. The third output member 80 is disposed at a side portion of the external gear 74 on the opposite input side. The carrier 78 and the third output member 80 each have a disk shape, and rotatably support the input shaft 72 via an input shaft bearing 71.

The carrier 78 and the third output member 80 are connected to each other via the carrier pin 75. The carrier pin 75 penetrates the plurality of external gears 74 in the axial direction at a position offset from an axis of the external gear 74 in the radial direction. The carrier pin 75 of the embodiment is provided integrally with the third output member 80. The plurality of carrier pins 75 are provided around the center axis line La of the internal gear 76 at predetermined intervals. In the embodiment, three carrier pins 75 are provided at 120° intervals in the circumferential direction.

The carrier pin 75 is fixed to the carrier 78 by a bolt B5. The carrier pin 75 connects the carrier 78 to the third output member 80. The carrier pin 75 penetrates a carrier pin hole 74b formed in the external gear 74.

The third output member 80 is an output member that outputs rotational power to the driven member 90. The casing 81 is a fixed member that is fixed to an external member that supports the third speed reducer 46. The third output member 80 is rotatably supported by the casing 81 via the main bearings 82 and 83.

The casing 81 has a tubular shape as a whole, and the internal gear 76 is provided at an inner peripheral portion thereof. The internal gear 76 meshes with the external gear 74. The internal gear 76 of the embodiment includes an internal gear main body integrated with the casing 81 and an outer pin 76a (pin member) which is rotatably supported by the internal gear main body and configures an internal tooth of the internal gear 76. The number of internal teeth of the internal gear 76 (the number of outer pins 76a) is slightly larger than the number of external teeth of the external gear 74 (in this example, only by 1).

The external gear 74 is provided with the carrier pin hole 74b through which the carrier pin 75 penetrates and an input shaft hole 74c with which the roller bearing 73 comes into contact. The carrier pin hole 74b and the input shaft hole 74c are provided to be offset from the center of the external gear 74.

The plurality of carrier pin holes 74b are provided to correspond to the carrier pins 75. In this example, three carrier pin holes 74b are provided at 120° intervals in the circumferential direction. The carrier pin 75 does not come into contact with the carrier pin hole 74b of the third speed reducer 46. The plurality of input shaft holes 74c are provided to correspond to the input shafts 72, and are circular holes into which the eccentric bodies 72a are inserted. In this example, three input shaft holes 74c are provided at 120° intervals in the circumferential direction.

The main bearing 83 exemplifies a third main bearing. The main bearings 82 and 83 include the main bearing 82 and the main bearing 83 provided on the opposite input side from the main bearing 82. The main bearing 82 is disposed between the carrier 78 and the casing 81. The main bearing 83 is disposed between the third output member 80 and the casing 81. Inner rings of the main bearings 82 and 83 are configured on outer peripheries of the carrier 78 and the third output member 80, respectively.

The oil seal 84 is provided between the third output member 80 and the casing 81.

An operation of the third speed reducer 46 configured as described above will be described. When the output shaft 36a of the third motor 36 rotates, rotational power is distributed from the output shaft 36a to the plurality of input gears 70, and each of the input gears 70 rotates in the same phase. When each of the input gears 70 rotates, the eccentric bodies 72a of the input shaft 72 rotates about a rotation center line passing through the input shaft 72, and the external gear 74 oscillates by the eccentric bodies 72a. When the external gear 74 oscillates, a meshing position between the external gear 74 and the internal gear 76 is shifted in turn, and one of the external gear 74 and the internal gear 76 rotates. The rotation of the input shaft 72 decelerates at a reduction ratio corresponding to a difference in number of teeth between the external gear 74 and the internal gear 76, and is output from the third output member 80 to the driven member 90.

A resin proportion of the third speed reducer 46 will be described. When the resin proportion of the third speed reducer 46 that supports a large mass on the base end side of the robot is relatively low, the positioning accuracy of the robot decreases. For this reason, the resin proportion of the third speed reducer 46 is lower than the resin proportion of the second speed reducer 44 in the embodiment, and is set to 20% or less in the embodiment. In this case, the stiffness of the robot on the base end side is increased, which is advantageous from a perspective of maintaining accuracy.

For example, the resin proportion of the third speed reducer 46 of the embodiment is 2%, and in order to realize this, for example, the oil seal 84 is a resin constituent member. In addition, the input gear 70, the input shaft 72, the external gear 74, the internal gear 76, the carrier 78, the third output member 80, the casing 81, the main bearings 82 and 83, the roller bearing 73, the carrier pin 75, and washers are metal constituent members.

Moment acting on the main bearing will be described. The third joint 16-A supports the first to fourth arms 21, 22, 23, and 24, the second joint 14, the first joints 12-A and 12-B, and the tool 29. That is, the third joint 16-A supports a mass larger than the second joint 14 does by the amount of the fourth arm 24 and the second joint 14. For this reason, moment corresponding to the supported mass described above acts on the main bearing 83 (third main bearing) of the third speed reducer 46 of the third joint 16-A via the third output member 80. Therefore, the moment that acts on the main bearing 83 (third main bearing) supporting the third output member 80 is larger than the moment that acts on the second main bearing 64 supporting the second output member 57.

Moment acting on the main bearing 83 (third main bearing) of the third joint 16-B is larger than the moment acting on the main bearing 83 (third main bearing) of the third joint 16-A by an amount corresponding to the masses of the third joint 16-A and the fifth arm 25. In addition, moment acting on the main bearing 83 (third main bearing) of the third joint 16-C is larger than the moment acting on the main bearing 83 (third main bearing) of the third joint 16-B by an amount corresponding to the masses of the third joint 16-B and the sixth arm 26. In these cases, a decrease in accuracy due to the moment can be reduced compared to a case where large moment acts on the main bearing of the speed reducer having a high resin proportion and low stiffness.

As described above, the first output member 56 connected to the driven member of the first speed reducer 42 is made of a resin. In this case, the stiffness of the robot 100 on the tip end side can be easily lowered, which is also advantageous for weight saving. In addition, the second output member 57 connected to the driven member of the second speed reducer 44 and the third output member 80 connected to the driven member of the third speed reducer 46 are made of a metal. In this case, a decrease in the positioning accuracy of the robot 100 can be suppressed. That is, a good balance can be realized in terms of stiffness on the tip end side and positioning accuracy.

The second output member 57 may be made of the same metal as the third output member 80, but is made of a metal different from the third output member 80 in the embodiment. Since moment acts on the third output member 80, which is larger than on the second output member 57, it is desirable to use a metal having a high Young's modulus accordingly. For example, the second output member 57 may be made of a first metal such as aluminum, and the third output member 80 may be made of a second metal having a higher Young's modulus than the first metal such as steel. In this case, the stiffness of the robot 100 on the base end side can be raised to suppress a decrease in positioning accuracy. In this case, the Young's modulus of the output member of the speed reducer that supports a larger mass on the base end side of the robot is high, which is advantageous from a perspective of maintaining the accuracy of the robot.

In the robot 100 of the embodiment configured as described above, the stiffness of the joint positioned on the base end side can be increased while reducing the stiffness of the joint positioned on the tip end side. For this reason, it is advantageous from a perspective of a balance between impact mitigating (safety improvement) and positioning accuracy maintaining, and a robot suitable for operating in the vicinity of a human without being isolated from the human can be provided.

Another Embodiment

A robot 200 according to another embodiment will be described. In the drawings and the description of another embodiment, the same or equivalent components and members as the one embodiment will be assigned with the same reference symbols. Description that is redundant with the one embodiment will be omitted as appropriate, and configurations different from the embodiment will be mainly described.

Figure 5:
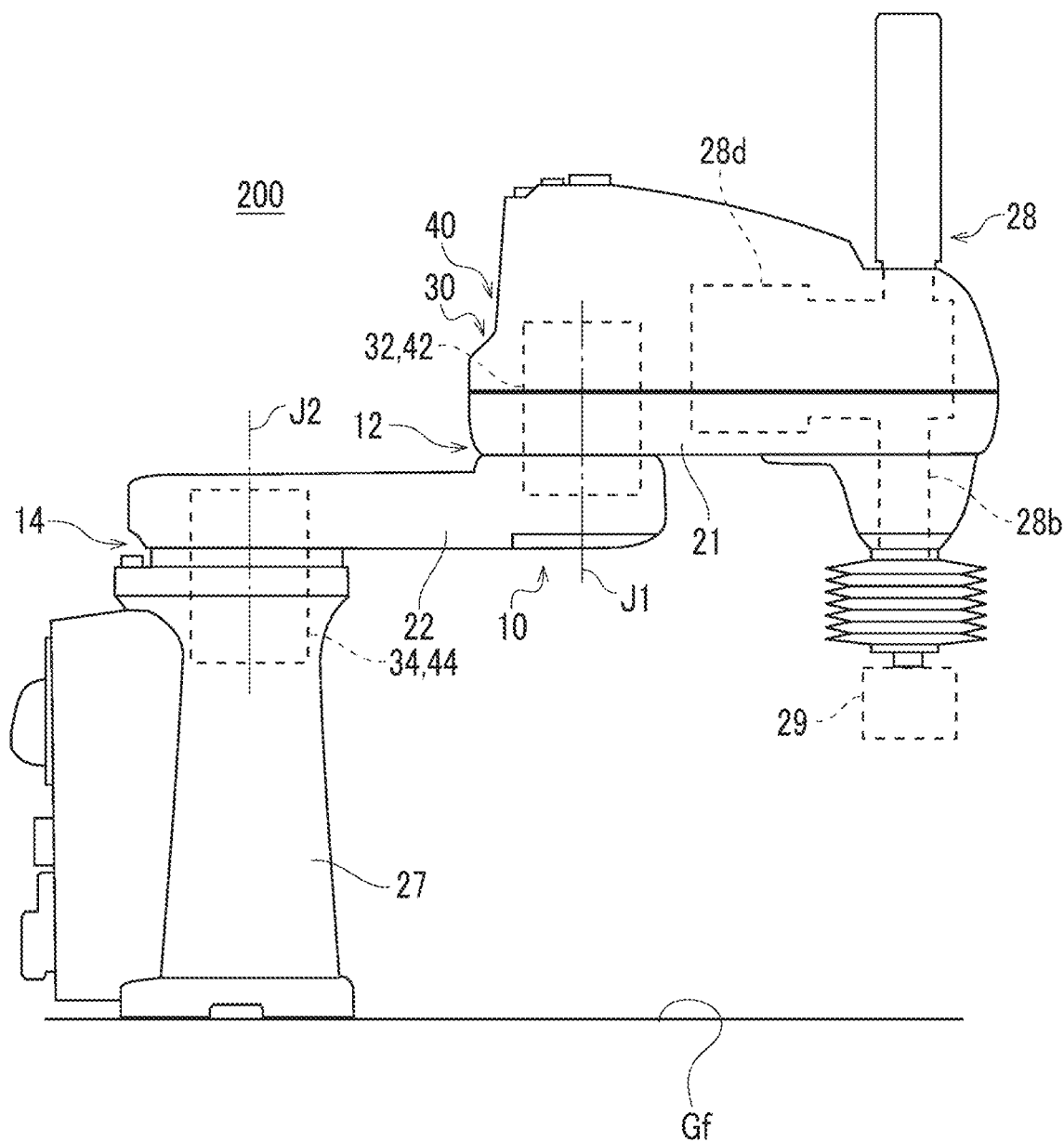
FIG. 5 is a side view schematically illustrating a robot according to another embodiment.

FIG. 5 is a side view schematically illustrating the robot 200 according to another embodiment. The robot 200 is a horizontal multi-axis type robot (scara type robot). The robot 200 has the base stage 27, the joint 10, the arm 20, and a raising and lowering unit 28. The base stage 27 is a tubular portion that is fixed to the provision surface Gf and extends upward from the provision surface Gf. The joint 10 includes the first joint 12 and the second joint 14 positioned on the base end side from the first joint 12. The second joint 14 is provided on an upper end of the base stage 27.

The arm 20 includes the first arm 21 connected to the tip end side of the first joint 12 and the second arm 22 connected between the first joint 12 and the second joint 14. The raising and lowering unit 28 is provided on the tip end side of the first arm 21. The raising and lowering unit 28 has a linear motion shaft 28b and a drive unit 28d that drives the linear motion shaft 28b so as to be raised and lowered. The drive unit 28d can be configured by, for example, a motor and a ball screw mechanism. The tool 29 is attached to a lower end of the linear motion shaft 28b.

The first motor 32 and the first speed reducer 42 are incorporated in the first joint 12. The second motor 34 and the second speed reducer 44 are incorporated in the second joint 14. The first and second motors 32 and 34 have the same configurations and characteristics as the first and second motors 32 and 34 of the one embodiment. The first and second speed reducers 42 and 44 have the same configurations and characteristics as the first and second speed reducers 42 and 44 of the one embodiment.

An operation of the robot 200 configured as described above will be described. In the robot 200, when a rotational driving force is input from the first motor 32 to the first speed reducer 42, the first output member 56 decelerates and rotates. The rotation of the first output member 56 drives the first arm 21, and the first arm 21 rotates about an axial center J1 of the first joint 12. In addition, when a rotational driving force is input from the second motor 34 to the second speed reducer 44, the second output member 57 decelerates and rotates. The rotation of the second output member 57 drives the second arm 22, and the second arm 22 rotates about an axial center J2 of the second joint 14. In the robot 200, the rotation of each arm 20 and a raising and lowering position of the linear motion shaft 28b are controlled such that the tool 29 moves along a predetermined trajectory. As described above, the present invention can be applied to various types of robots.

In the embodiment, the same operational effects as the one embodiment are obtained.

Examples of the embodiments of the present invention have been described in detail hereinbefore. All the embodiments described above are merely specific examples for implementing the present invention. The content of the embodiments does not limit the technical scope of the present invention, and it is possible to make many design changes, such as component change, addition, and deletion, without departing from the gist of the invention defined in the claims. Although content which is possible to undergo such design changes is described with expressions such as "of the embodiment" and "in the embodiment" in the embodiments described above, it does not mean that design changes are not allowed for content without such expressions. In addition, hatching attached to a section in the drawings does not limit a material for a hatched object.

Hereinafter, a modification example will be described. In the drawings and description of the modification example, components and members which are the same or equivalent to the embodiments will be assigned with the same reference symbols. Description that is redundant with the embodiments will be omitted as appropriate, and configurations different from the embodiments will be mainly described.

Modification Example

Some of the members described as resin constituent members in the description of the one embodiment may be metal constituent members. In addition, some of members described as metal constituent members in the description of the one embodiment may be resin constituent members. That is, insofar as a resin proportion can be achieved for each of the first speed reducer 42, the second speed reducer 44, and the third speed reducer 46, which constituent member is to be made of a resin and which constituent member is to be made of a metal, out of constituent members of each speed reducer, are not particularly limited. In addition, the resin proportion of each of the first speed reducer 42, the second speed reducer 44, and the third speed reducer 46 is not limited to the value described in the embodiment. The resin proportion can be selected as appropriate insofar as the resin proportion of the first speed reducer 42 is larger than the resin proportion of the second speed reducer 44 and the resin proportion of the second speed reducer 44 is larger than the resin proportion of the third speed reducer 46.

In a case of having three or more joints as in the robot 100 according to the one embodiment, it is preferable that the resin proportion of a speed reducer of each joint increases as going from the base end side to the tip end side. However, speed reducers with the same resin proportion may be included. Alternatively, as for some speed reducers, the resin proportion of the speed reducer on the base end side may be larger than the resin proportion of the speed reducer on the tip end side. That is, the resin proportion of at least one speed reducer on the tip end side may be larger than the resin proportion of at least one speed reducer on the base end side.

Although an example in which the first and second speed reducers 42 and 44 are flexible meshing type gear devices and the third speed reducer 46 is an eccentric oscillating type gear device is given in the description of the one embodiment, the present invention is not limited thereto. The reduction mechanism of each speed reducer is not particularly limited. For example, one or both of the first and second speed reducers 42 and 44 may be an eccentric oscillating type gear device, or the third speed reducer 46 may be a flexible meshing type gear device.

Each modification example described above obtains the same operation and effects as the one embodiment.

Any combination of each of the embodiments and the modification example described above is also useful as an embodiment of the present invention. A new embodiment generated by combination has each of the effects of the combined embodiments and modification example.

It should be understood that the invention is not limited to the above-described embodiment, but may be modified into various forms on the basis of the spirit of the invention. Additionally, the modifications are included in the scope of the invention.

What is claimed is:

1. A robot comprising:
    a first joint;
    a first speed reducer incorporated in the first joint;
    a first output member connected to a driven member of the first speed reducer, the first output member being made of a resin;
    a second joint positioned on a base end side from the first joint;
    a second speed reducer incorporated in the second joint;
    a second output member connected to a driven member of the second speed reducer, the second output member being made of a first metal;
    a third joint that is on the base end side from the second joint;
    a third speed reducer incorporated in the third joint; and
    a third output member connected to a driven member of the third speed reducer, the third output member being made of a second metal having a Young's modulus higher than the first metal,
    wherein:
        a volume proportion of a resin occupying a constituent member of the first speed reducer is larger than a volume proportion of a resin occupying a constituent member of the second speed reducer,
        a volume proportion of a resin occupying a constituent member of the third speed reducer is smaller than the volume proportion of the resin occupying the constituent member of the second speed reducer, and
        a moment that acts on a first main bearing supporting the first output member of the first speed reducer is larger than a moment that acts on a second main bearing supporting the second output member of the second speed reducer.

2. The robot according to claim 1,
    wherein:
        a moment that acts on a third main bearing supporting the third output member of the third speed reducer is larger than the moment that acts on the second main bearing supporting the second output member of the second speed reducer.

3. The robot according to claim 1,
    wherein:
        the first speed reducer comprises a first motor, and
        the second speed reducer comprises a second motor.

4. The robot according to claim 1,
    wherein:
        the first speed reducer is a flexible meshing type gear device, and
        the second speed reducer is an eccentric oscillating type gear device.

5. The robot according to claim 1,
    wherein the first speed reducer comprises:
        a wave generation unit,
        an external gear that meshes with an internal gear by being bent in a radial direction by the wave generation unit,
        a retainer that holds the wave generation unit, and
        the internal gear and the retainer are made of a resin.

6. The robot according to claim 1,
    wherein:
        a resin proportion of the first speed reducer is set to 70% or more, and
        a resin proportion of the second speed reducer is set to 60% or less.

7. The robot according to claim 1,
    wherein:
        a resin proportion of the first speed reducer is set to 70% or more,
        a resin proportion of the second speed reducer is set to 60% or less, and
        a resin proportion of the third speed reducer is set to 20% or less.

8. The robot according to claim 1,
    wherein:
        the first joint is positioned closest to a tip end side, and
        the second joint is positioned closest to the base end side.

9. The robot according to claim 1,
    wherein:
        a bearing support portion which supports a main bearing of the first speed reducer is made of a resin, and
        a bearing support portion which supports a main bearing of the second speed reducer is made of a metal.

10. The robot according to claim 1,
    wherein:
        the constituent member of the first speed reducer is configured to include a first metal, and
        the constituent member of the second speed reducer is configured to include a second metal having a higher Young's modulus than the first metal.

11. The robot according to claim 1, further comprising:
    a first motor that transmits power to the first speed reducer; and
    a second motor that transmits power to the second speed reducer,
    wherein:
        the first motor is incorporated in the first joint and the second motor is incorporated in the second joint.

12. The robot according to claim 1, further comprising:
    a first motor that transmits power to the first speed reducer; and
    a second motor that transmits power to the second speed reducer, wherein:
the first motor is provided at a location apart from the first joint and transmits power to the first speed reducer, and
the second motor is provided at a location apart from the second joint and transmits power to the second speed reducer.

13. The robot according to claim 1, further comprising:
a third motor that transmits power to the third speed reducer,
wherein:
the third motor is incorporated in the third joint.

14. The robot according to claim 1, further comprising:
a third motor that transmits power to the third speed reducer,
wherein:
the third motor is provided at a location apart from the third joint and transmits power to the third speed reducer.

15. A robot comprising:
a first joint;
a first speed reducer incorporated in the first joint, the first speed reducer being a flexible meshing type gear device;
a second joint positioned on a base end side from the first joint; and
a second speed reducer incorporated in the second joint, the second speed reducer being an eccentric oscillating type gear device,
wherein a volume proportion of a resin occupying a constituent member of the first speed reducer is larger than a volume proportion of a resin occupying a constituent member of the second speed reducer.

16. A robot comprising:
a first joint;
a first speed reducer incorporated in the first joint, a resin proportion of the first speed reducer being set to 70% or more;
a second joint positioned on a base end side from the first joint; and
a second speed reducer incorporated in the second joint, a resin proportion of the second speed reducer being set to 60% or less,
wherein a volume proportion of a resin occupying a constituent member of the first speed reducer is larger than a volume proportion of a resin occupying a constituent member of the second speed reducer.

* * * * *